US008665340B2

(12) United States Patent
Prentice et al.

(10) Patent No.: US 8,665,340 B2
(45) Date of Patent: Mar. 4, 2014

(54) INDOOR/OUTDOOR SCENE DETECTION USING GPS (75) Inventors: Wayne E. Prentice, Honeoye Falls, NY (US); Robert M. Guidash, Rochester, NY (US); Frank Razavi, Fairport, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 286 days.

(21) Appl. No.: 12/769,680

(22) Filed: Apr. 29, 2010

(65) Prior Publication Data

US 2011/0267492 A1 Nov. 3, 2011

(51) Int. Cl.
*H04N 5/228* (2006.01)

(52) U.S. Cl.
USPC .................. 348/222.1; 348/207.99; 348/223.1

(58) Field of Classification Search
USPC ................................ 348/223.1, 207.99, 222.1
See application file for complete search history.

(56) References Cited

U.S. PATENT DOCUMENTS

| 3,971,065 | A |  | 7/1976 | Bayer |  |
|---|---|---|---|---|---|
| 4,642,678 | A |  | 2/1987 | Cok |  |
| 4,774,574 | A |  | 9/1988 | Daly et al. |  |
| 5,086,314 | A |  | 2/1992 | Aoki et al. |  |
| 5,189,511 | A |  | 2/1993 | Parulski et al. |  |
| 5,493,335 | A |  | 2/1996 | Parulski et al. |  |
| 5,652,621 | A |  | 7/1997 | Adams, Jr. et al. |  |
| 5,668,597 | A |  | 9/1997 | Parulski et al. |  |
| 5,913,078 | A |  | 6/1999 | Kimura et al. |  |
| 6,192,162 | B1 |  | 2/2001 | Hamilton, Jr. et al. |  |
| 6,281,797 | B1 | * | 8/2001 | Forster et al. | 340/572.3 |
| 6,292,218 | B1 |  | 9/2001 | Parulski et al. |  |
| 6,895,368 | B2 |  | 5/2005 | Murakami |  |
| 6,934,056 | B2 |  | 8/2005 | Gindele et al. |  |
| 7,126,639 | B2 |  | 10/2006 | Cazier et al. |  |
| 7,542,077 | B2 |  | 6/2009 | Miki |  |
| 2004/0174434 | A1 |  | 9/2004 | Walker et al. |  |
| 2005/0191729 | A1 |  | 9/2005 | Kaczmarek et al. |  |
| 2007/0004386 | A1 | * | 1/2007 | Singh et al. | 455/414.1 |
| 2007/0099629 | A1 | * | 5/2007 | Twitchell | 455/456.1 |
| 2008/0249756 | A1 | * | 10/2008 | Chaisuparasmikul | 703/13 |
| 2012/0302259 | A1 | * | 11/2012 | Busch | 455/456.3 |

FOREIGN PATENT DOCUMENTS

| JP | 2008 292663 |  | 12/2008 |
| JP | 2008292663 | A * | 12/2008 |
| JP | 2009 260853 |  | 11/2009 |

* cited by examiner

*Primary Examiner* — Antoinette Spinks (57) ABSTRACT

A digital camera system, comprising: a digital image sensor; an optical system for forming an image of a scene onto the digital image sensor; a global positioning system sensor; a processor-accessible memory system; and a processor. The processor performs the steps of analyzing a signal from the global positioning system sensor to determine whether the digital camera system is indoors or outdoors; capturing an input digital image of the scene using the digital image sensor; processing the input digital image responsive to whether the digital camera system is indoors or outdoors; and storing the processed digital image in the processor-accessible memory system.

3 Claims, 6 Drawing Sheets

INDOOR/OUTDOOR SCENE DETECTION USING GPS

FIELD OF THE INVENTION

The invention relates generally to a digital camera system, and more particularly to a digital camera system that determines whether it is indoors or outdoors by analyzing a signal from a global positioning system sensor.

BACKGROUND OF THE INVENTION

Automatic exposure control of a camera is generally achieved by detecting the brightness of an object with a light metering device, determining an exposure value based on said object brightness and the sensitivity of the imaging system, and driving the diaphragm and the shutter according to said exposure value. However, in such cases where the exposure determination is based solely on the object brightness and the sensitivity of the imaging system, the resulting photographs often do not convey the appearance that the photographer intended to communication. For example, a photographer may intend that a photograph captured at dusk would convey a corresponding appearance. However, such photographs are often reproduced with an unnatural appearance where the image brightness has been adjusted to make the light level be the same as a daytime photograph.

This has led to the development of various photography modes that can be user-selected in different photography environments according to the photographer's preferences. For example, different photography modes are offered on some digital cameras that have optimized for typical outdoor daylight-illuminated environments, typical indoor tungsten-illuminated environments and other specialized cases such as sunset environments.

Some attempts have been made to automate the selection of appropriate photography modes. One example of this process can be found in U.S. Pat. No. 5,086,314 to Aoki et al., entitled "Exposure control apparatus for camera," which teaches using a reduced exposure level when it is determined that a photograph is being captured at dusk in order to better convey the appearance of a dusk scene.

U.S. Pat. No. 5,913,078 to Kimura et al., entitled "Camera utilizing a satellite positioning system," teaches a camera adapted to determine position information using a Global Positioning System (GPS) sensor in order to record a geographic location together with a photographed image.

U.S. Pat. No. 6,895,368 to Murakami, entitled "Maintenance information supply system with a host computer and an electronic device," discloses a maintenance information supply system in which an electronic device terminal includes a GPS sensor for obtaining the present location information. The maintenance information supply system calculates maintenance information responsive to the determined position. The system determines that it is located at an indoor location when a valid GPS signal is not detected.

SUMMARY OF THE INVENTION

The present invention represents a digital camera system, comprising:
 a digital image sensor;
 an optical system for forming an image of a scene onto the digital image sensor;
 a global positioning system sensor;
 a processor-accessible memory system;
 a processor for performing the steps of:
  analyzing a signal from the global positioning system sensor to determine whether the digital camera system is indoors or outdoors;
  capturing an input digital image of the scene using the digital image sensor;
  processing the input digital image responsive to whether the digital camera system is indoors or outdoors; and
  storing the processed digital image in the processor-accessible memory system.

This invention has the advantage that it can automatically adjust various camera settings to provide improved image quality by determining whether the digital camera is being operated indoors or outdoors.

It has the further advantage that camera settings can be adjusted responsive to a determined geographic location and an image capture date and time.

It has the additional advantage that a lighting type can automatically be determined using a geographical database, and can be used to further improve the image quality by adjusting various camera settings in response to the determined lighting type.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 1:
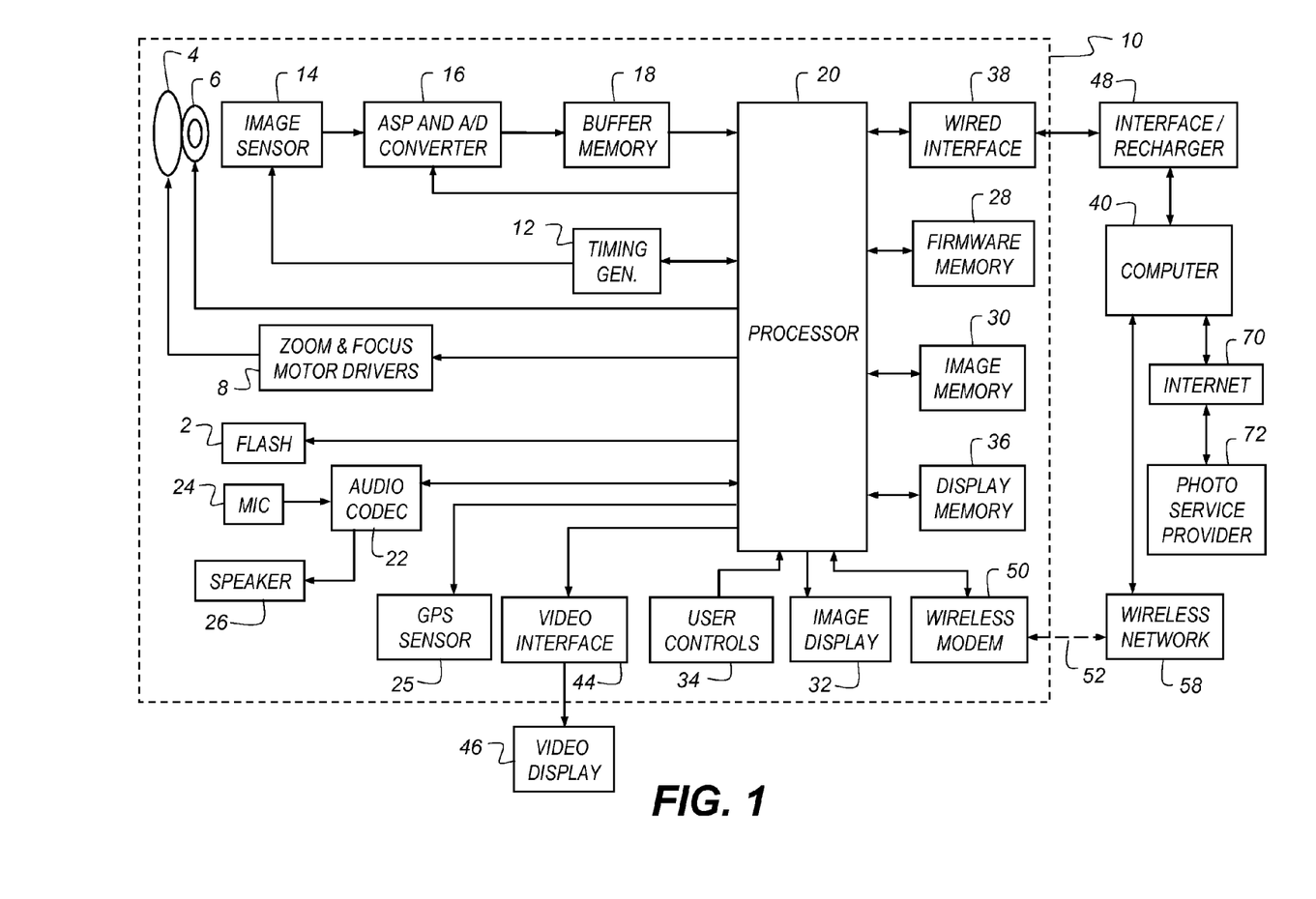
FIG. 1 is a high-level diagram showing the components of a digital camera system.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931, filed on Jul. 28, 2007 and titled "Image sensor with improved light sensitivity" to Compton and Hamilton, the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixel values, or by combining some color pixel values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses a shutter button, which is one of the user controls 34, and the second mode (i.e., still image capture mode) is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

A global position system (GPS) sensor 25 on the digital camera 10 can be used to provide geographical location information which is used for implementing the present invention, as will be described later with respect to FIG. 3. GPS sensors 25 are well-known in the art and operate by sensing signals emitted from GPS satellites. A GPS sensor 25 receives highly accurate time signals transmitted from GPS satellites. The precise geographical location of the GPS sensor 25 can be determined by analyzing time differences between the signals received from a plurality of GPS satellites positioned at known locations.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
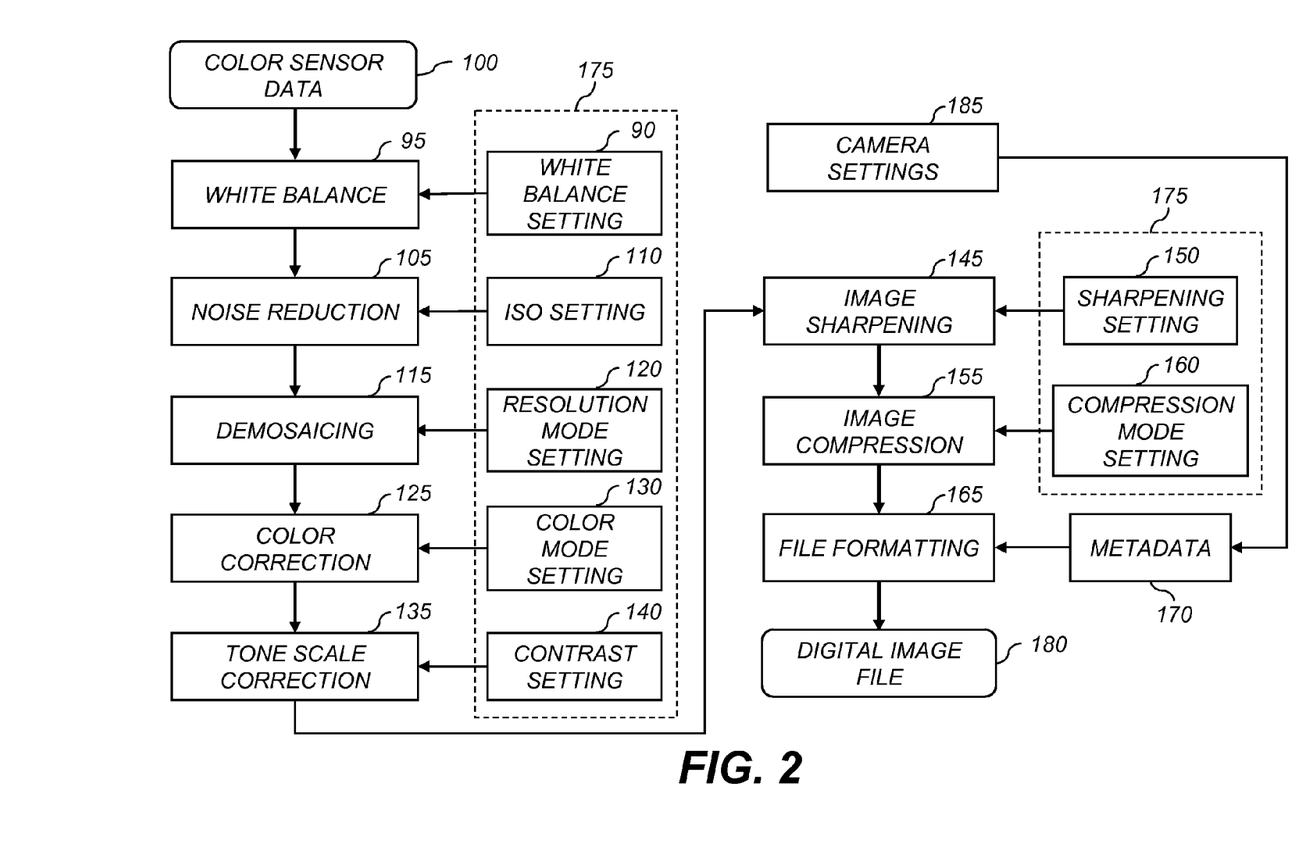
FIG. 2 is a flow diagram depicting typical image processing operations used to process digital images in a digital camera.

FIG. 2 is a flow diagram depicting typical image processing operations performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various user settings 175, which can be selected via the user controls 34 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Mild, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et at, entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about camera settings 185. The camera settings 185 would include many different types of information such as exposure time, lens F/#, color correction settings, image size, compression level and indications of the user settings 175.

In photography, it is often desirable to have knowledge about the image capture environment in which a picture is being captured in order to choose the most appropriate camera settings. Digital cameras commonly adjust various camera settings in response to information provided by various environmental sensors that sense environmental attributes such as scene brightness, illuminant color temperature and subject distance, as well as user-provided information specified by user settings 175.

One particular aspect of the image capture environment that is relevant to determining various camera settings is whether an image is captured in an indoor or outdoor setting. For example, digital cameras commonly adjust parameters used in image processing operations such as the white balance step 95 and the color correction step 125 in response to information about the scene illuminant. Typically, the information about the scene illuminant is either provided by user settings 175 or by evaluating a measured distribution of scene colors. The process of estimating the scene illuminant can be more accurate if it is aware of the indoor/outdoor status. For example, some artificial light sources can be excluded as candidate scene illuminants if the image capture conditions are known to be outdoors. This would improve images of foliage under daylight capture conditions which can sometimes be confused with indoor fluorescent lighting. Likewise, knowledge of the indoor/outdoor status can improve the ability to distinguish between a sunset scene and a tungsten-illuminated indoor scene.

Similarly, the process of determining an appropriate exposure level can also be more accurate if it is aware of the indoor/outdoor status. For example, if it is known that an image is being captured outdoors, then a knowledge of the geographical location and the date/time can be used to predict whether the image is being captured under a likely sunset condition. When likely sunset conditions are encountered, than a sunset mode can be selected which can reduce the scene exposure to better preserve the look of the sunset. Various color correction settings can also be adjusted in order to enhance the color saturation of the sunset.

Information about whether a scene was captured indoors or outdoors can also provide value for image organization tasks. For example, when a user is searching for a particular image, whether an image was captured indoors or outdoors is an easily remembered detail that can be useful for defining search conditions. If the indoor/outdoor status is determined and associated with the image as metadata, search software can use this information in the searching process.

The present invention will now be described with reference to FIG. 3, which is a flow chart showing a method for determining whether a digital camera is operating indoors or outdoors by analyzing a GPS signal 205 determined using the GPS sensor 25 (FIG. 1). The indoor/outdoor status is then used to control the processing for a captured image.

A sense GPS signal step 200 is used to sense the GPS signal 205 using the GPS sensor 25. An analyze GPS signal step 210 is used to analyze the GPS signal 205 to determine whether the digital camera is outdoors 215 or indoors 220. More details of the analyze GPS signal step 210 will be described later with reference to FIG. 4.

If the digital camera is determined to be outdoors 215, a determine outdoor camera settings step 225 is used to determine various camera settings 185 that are appropriate for outdoor photography. Similarly, if the digital camera is determined to be indoors 220, a determine indoor camera settings step 235 is used to determine various camera settings 185 that are appropriate for indoor photography.

The camera settings 185 can be set in any way known to those skilled in the art. Particular camera settings 185 that are commonly modified according to indoor and outdoor camera modes would include capture settings (e.g., exposure time, lens F/#, sensor ISO, whether to fire an electronic flash) and color processing settings (e.g., white balance gain values, color correction matrix coefficients). The determine outdoor camera settings step 225 and the determine indoor camera settings step 235 are optionally responsive to the GPS signal 205. (Note that optional features are shown using dashed lines in the accompanying figures.) More details about the determine outdoor camera settings step 225 and the determine indoor camera settings step 235 according to a preferred embodiment of the present invention will be described later with reference to FIGS. 5 and 6, respectively.

A capture digital image step 240 is used to capture an input digital image 245 using the image sensor 14. The capture digital image step 240 will typically be controlled responsive to various capture settings such as exposure time, lens F/#, sensor ISO, and whether to fire the electronic flash 2 (FIG. 1). As mentioned earlier, some or all of these capture settings can be camera settings 185 that are controlled responsive to whether the digital camera is determined to be outdoors 215 or indoors 220.

A process digital image step 250 is used to process the input digital image to form a processed digital image 255. The process digital image step 250 typically applies a series of image processing operations such as those that were described relative to FIG. 2. Camera settings associated with any or all of the image processing steps in the FIG. 2 imaging chain can be adjusted responsive to whether the digital camera is determined to be outdoors 215 or indoors 220. In one embodiment of the present invention, color processing settings such as white balance gain values and color correction matrices are adjusted to account for the different scene illumination conditions that are encountered for indoor and outdoor capture conditions.

A store digital image step 260 stores the processed digital image 255 as digital image file 180. The store digital image step 260 will typically include the image compression step 155 and the file formatting step 165 that were described with reference to FIG. 2. Various aspects of these steps are controlled by camera settings 185, any of which can be adjusted responsive to whether the digital camera is determined to be outdoors 215 or indoors 220.

As discussed with reference to the file formatting step 165 in FIG. 2, metadata 170 giving an indication of the camera settings 185 is generally included in the digital image file 180. In a preferred embodiment of the present invention, the metadata 170 includes an indication of whether the digital camera is determined to be outdoors 215 or indoors 220. As mentioned earlier, this metadata can be useful for various applications such as searching for particular digital images using image organization software.

Figure 3:
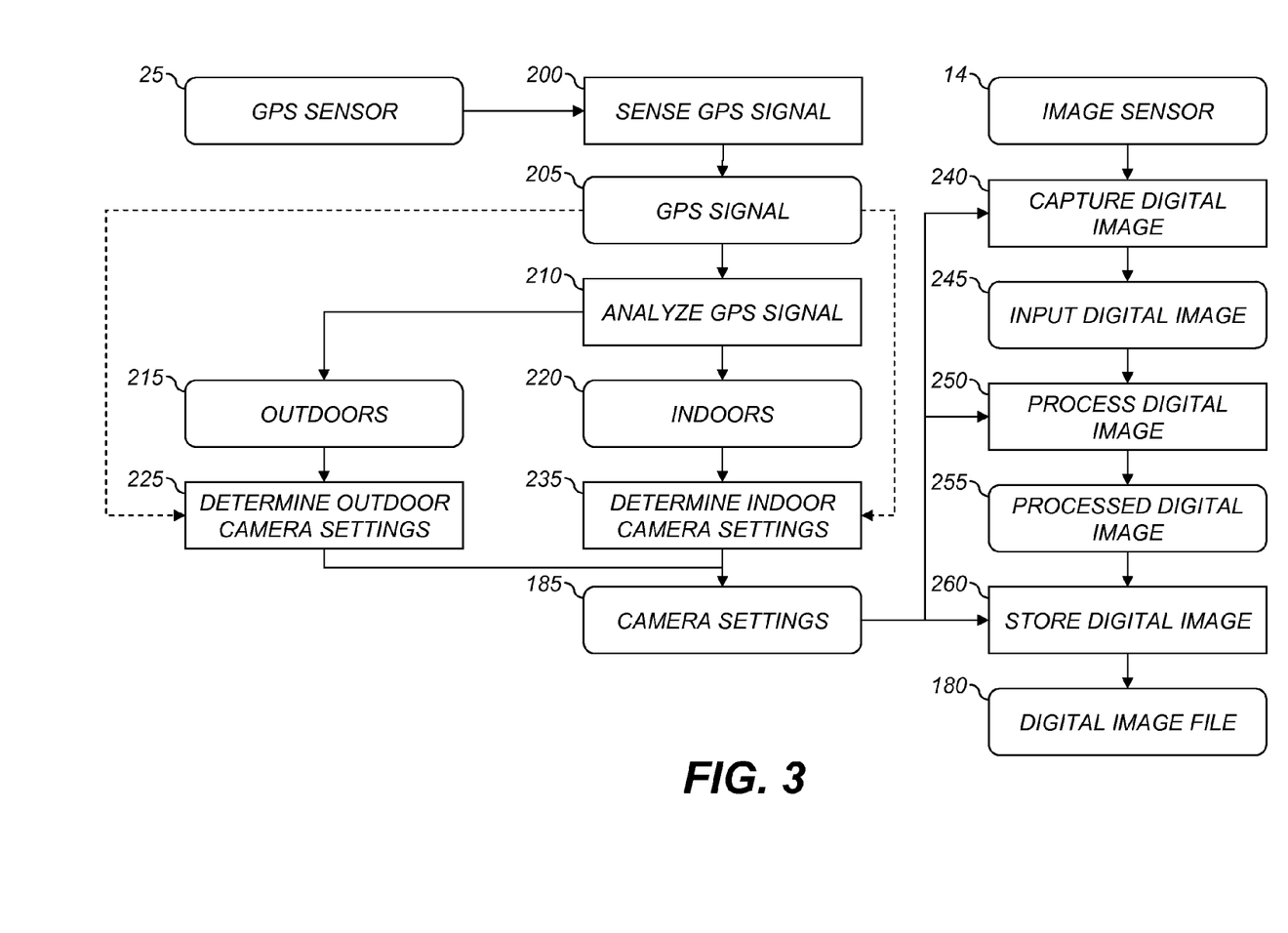
FIG. 3 is a flow chart showing a method for determining whether a digital camera is operating indoors or outdoors and adjusting camera settings accordingly.
Figure 4:
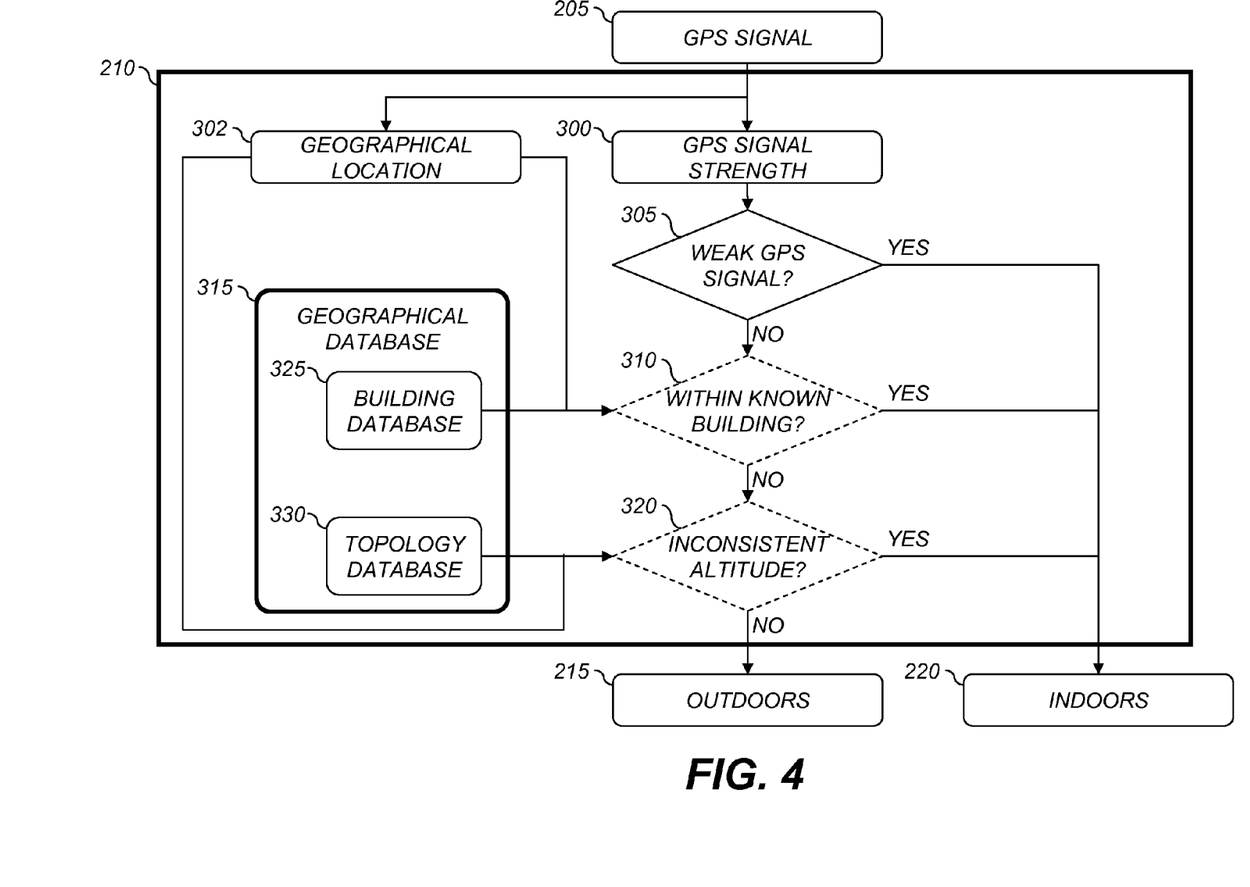
FIG. 4 is a flow chart giving more detail for the analyze GPS signal step of FIG. 3 according to one embodiment of the present invention.

FIG. 4 shows a flow chart giving more detail for the analyze GPS signal step 210 of FIG. 3 according to one embodiment of the present invention. First, a weak GPS signal test 305 is used to analyze the GPS signal 205. The transmission frequency for GPS signals from GPS satellites is in the UHF radio band; therefore the signals are attenuated or blocked by solid objects like walls of buildings. The GPS system consists of about 26 satellites, of which about 8 are visible to the receiver at any given point in time due the orbits.

A typical GPS receiver can track multiple satellites and maintains signal level data for each satellite it is currently tracking. The location of the satellites is relative to the horizon from the perspective of the receiver is also tracked. A significant drop in signal level from satellites near zenith is an indication overhead attenuation of the GPS signal, consistent with being indoors.

The weak GPS signal test 305 evaluates the strengths of the signals it is receiving from the various satellites, paying particular attention to the satellites that are nearest to zenith. If the signal strength falls below a predetermined threshold, the weak GPS signal test 305 provides an indication that the digital camera 10 (FIG. 1) is indoors 220. Likewise, if the signal strength is above a predetermined threshold, it can be concluded that the digital camera 10 is probably outdoors.

In some embodiments, the analyze GPS signal step 210 uses only the weak GPS signal test 305 to determine whether the digital camera 10 is outdoors or indoors. However, the weak GPS signal test 305 does not always provide a reliable determination that the digital camera 10 is outdoors. For example, if the digital camera 10 is indoors but near a window, or other UHF transmissive material, the GPS sensor 25 (FIG. 1) can still receive a GPS signal 205 in some cases. Therefore, in some embodiments of the present invention, it can be useful to supplement the weak GPS signal test 305 with additional optional indications of whether the digital camera 10 is in an indoor or outdoor environment.

In some embodiments, a geographical database 315 can be used by the analyze GPS signal step 210 to provide additional indications of whether the digital camera is outdoors 215 or indoors 220. The geographical database 315 can include a building database 325 that provides an indication of land usage as a function of longitude and latitude, indicating the locations of known buildings and known open spaces.

An optional within known building test 310 can compare a geographic location 302 (longitude and latitude) determined from the GPS signal 205 to the building database 325 to determine whether the geographic location 302 corresponds to the location of a known building. If so, the within known building test 310 provides an indication that the digital camera 10 is indoors 220.

Satellite imagery showing land usage is widely available today. Such imagery can be manually or automatically analyzed to populate the building database 325 which can be stored in a memory system accessible to the digital camera 10 (e.g., in a memory in the digital camera 10, or in a location that can be accessed using a wireless communication network). In some embodiments, the user can be enabled to update the building database 325 to include building locations that are not included in the provided building database 325, or can be provided with tools to define his/her own building database 325 corresponding to locations where the user frequently captures photographs.

An optional inconsistent altitude test 320 can be used to provide an additional indication of whether the digital camera 10 is outdoors 215 or indoors 220. The geographical location 302 determined by analyzing the GPS signal 205 includes not only longitude and latitude values, but also an elevation value relative to sea level. The geographical database 315 can include a topology database 330 that provides an indication of ground elevation as a function of longitude and latitude. The inconsistent altitude test 320 compares the known ground elevation at the current longitude and latitude determined from the topology database 330 to the elevation value for the geographical location 302. If it is found that the elevation value for the geographical location 302 is substantially higher than the known ground elevation at that location, then it can be concluded that the digital camera is probably being used on an upper floor of a building. In this case, the inconsistent altitude test 320 provides an indication that the digital camera 10 is indoors 220, otherwise it provides an indication that the digital camera 10 is outdoors 215.

In some embodiments, the analyze GPS signal step 210 can include all three of the tests shown in FIG. 4 (the weak GPS signal test 305, the within known building test 310 and the inconsistent altitude test 320). In other embodiments, only a subset of these tests can be used. In some embodiments, the various tests can be executed in a sequential manner as shown in the example of FIG. 4. In other embodiments, a plurality of tests can be run in parallel and the results can be combined using a model which weights the individual test results in a probabilistic manner. For example, a probability value that the digital camera is indoors can be determined as a function of a determined signal strength value and a determined elevation above ground level value:

$$P_{indoors} = f(S, Z_G) \quad (5)$$

where $P_{indoors}$ is the probability that the digital camera 10 is indoors, S is the determined signal strength value, $Z_G$ is the determined elevation above ground level value, and f(·) is a probability function that can be determined by fitting experimentally determined data using methods well known in the art. If the probability that the digital camera 10 is indoors is determined to be more than 50%, then the analyze GPS signal step 210 can provide an indication the digital camera 10 is indoors 220. Otherwise, it can provide an indication the digital camera 10 is outdoors 215.

Those skilled in the art will recognize that the GPS signal 205 can be analyzed in other manners to provide an indication of whether the digital camera 10 is outdoors 215 or indoors 220. For example, rather than analyzing the GPS signal strength 300 itself, the analyze GPS signal test 210 can monitor the GPS signal strength 300 over time and can provide an indication that the digital camera 10 has moved to an indoors location when a substantial drop in the GPS signal strength 300 is detected.

In general, when it is determined that the digital camera 10 is outdoors 215, the digital camera 10 can be operated in a default outdoor photography mode. Such a mode would include a default exposure determination process and a default image processing chain, including default white balance and color correction operations that are designed for a typical daylight illumination. In some embodiments of the present invention, the determine outdoor camera settings step 225 simply sets the digital camera 10 to operate in the default outdoor photography mode.

Figure 5:
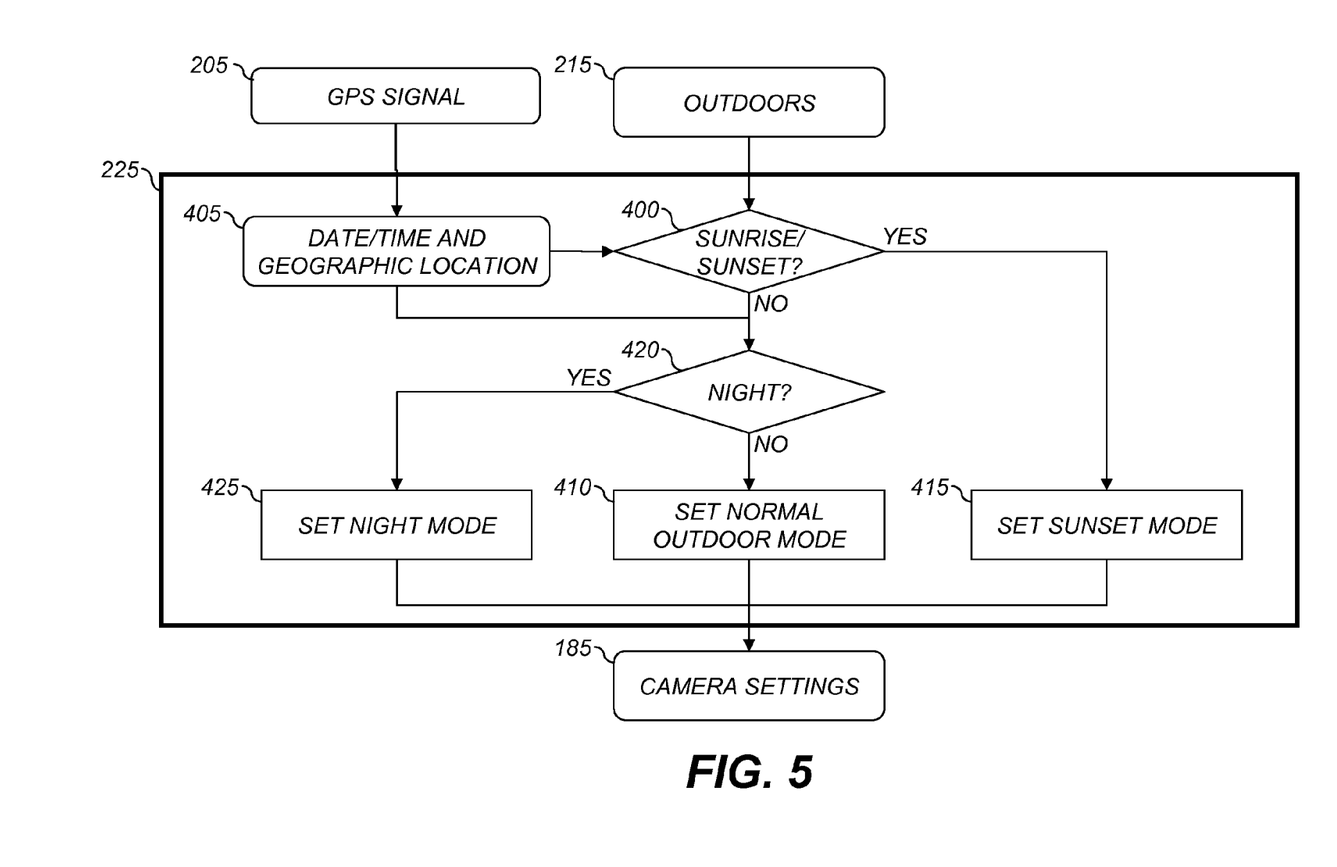
FIG. 5 is a flow chart giving more detail for the determine outdoor camera settings step 225 of FIG. 3 according to one embodiment of the present invention.

While the default outdoor photography mode will produce good results in most outdoor environments, there are certain photography situations where other alternate outdoor photography modes are known to produce superior results. For example, when photographing sunsets and sunrises, it can be preferable to adjust the exposure and color processing to provide images having enhanced colorfulness. FIG. 5 shows a flow chart illustrating more details of the determine outdoor camera settings step 225 according to one embodiment of the present invention which selects a sunset photography mode when it is determined that the digital camera 10 is capturing an image in a likely sunrise or sunset environment.

A sunrise/sunset test 400 is used to analyze a date/time and geographic location 405 determined from the GPS signal 205 to determine whether the image capture environment is likely to correspond to sunrise or sunset conditions. Given a geographical location, together with the date, well-known methods can be used to determine corresponding sunrise and sunset times.

In one embodiment, the sunrise/sunset test 400 computes the sunrise and sunset times corresponding to the date and geographic location determined as part of the date/time and geographic location 405. The determined sunrise and sunset times are then compared to the time from the determined date/time and geographic location 405. If the time falls within a specified time interval around the sunrise and sunset times, then a set sunset mode step 415 is executed to select appropriate camera settings 185.

The set sunset mode step 415 selects camera settings 185 appropriate to set the digital camera to operate in a sunset mode which is designed to produce pleasing sunrise and sunset photographs. The sunset mode has associated exposure settings, white balance settings and color correction settings that are appropriate for sunset photography. For example, the sunset mode can introduce an exposure shift to reduce the exposure level by a defined increment in order to avoid washing out the sunset colors. Similarly, the sunset mode can use white balance settings that override any automatic white balance settings that might tend to remove the reddish tint, and can use color correction settings that can boost the image colorfulness in order to enhance the sunset colors.

If the sunrise/sunset test 400 determines that the digital camera 10 is not being operated at sunrise or sunset, a night test 420 is used to determine whether the digital camera is being operated at night. If so, a set night mode step 425 is executed to select the camera settings 185, otherwise a set normal outdoor mode step 410 is executed to select the camera settings 185.

The set night mode step 425 selects camera settings 185 appropriate for night photography. Daylight can be ruled out as a possible illuminant for night photography; rather it can be assumed that the scene illumination will be provided by the flash 2, or by some other artificial illumination. The set night mode step 425 can be used to set the digital camera to a mode where the flash 2 will automatically be fired (unless a level of ambient illumination is detected). The set night mode step 425 can also be used to select color correction settings that are appropriate for the flash 2 (or for other artificial illuminants). In the night mode, it can also be desirable to reduce the overall exposure level to maintain the impression of the image being captured at night and to avoid overexposure problems that are commonly observed for night flash photographs.

The set normal outdoor mode step 410 selects camera settings 185 appropriate to set the digital camera to operate in the default outdoor photography mode. The camera settings 185 would include settings such as exposure settings, white balance settings and color correction settings.

In some embodiments of the present invention, the determine indoor camera settings step 235 (FIG. 3) simply sets the digital camera 10 to operate in a default indoor photography mode. While the default indoor photography mode will produce good results in most indoor environments, there are certain photography situations where it can be appropriate to use other alternate indoor photography modes.

Figure 6:
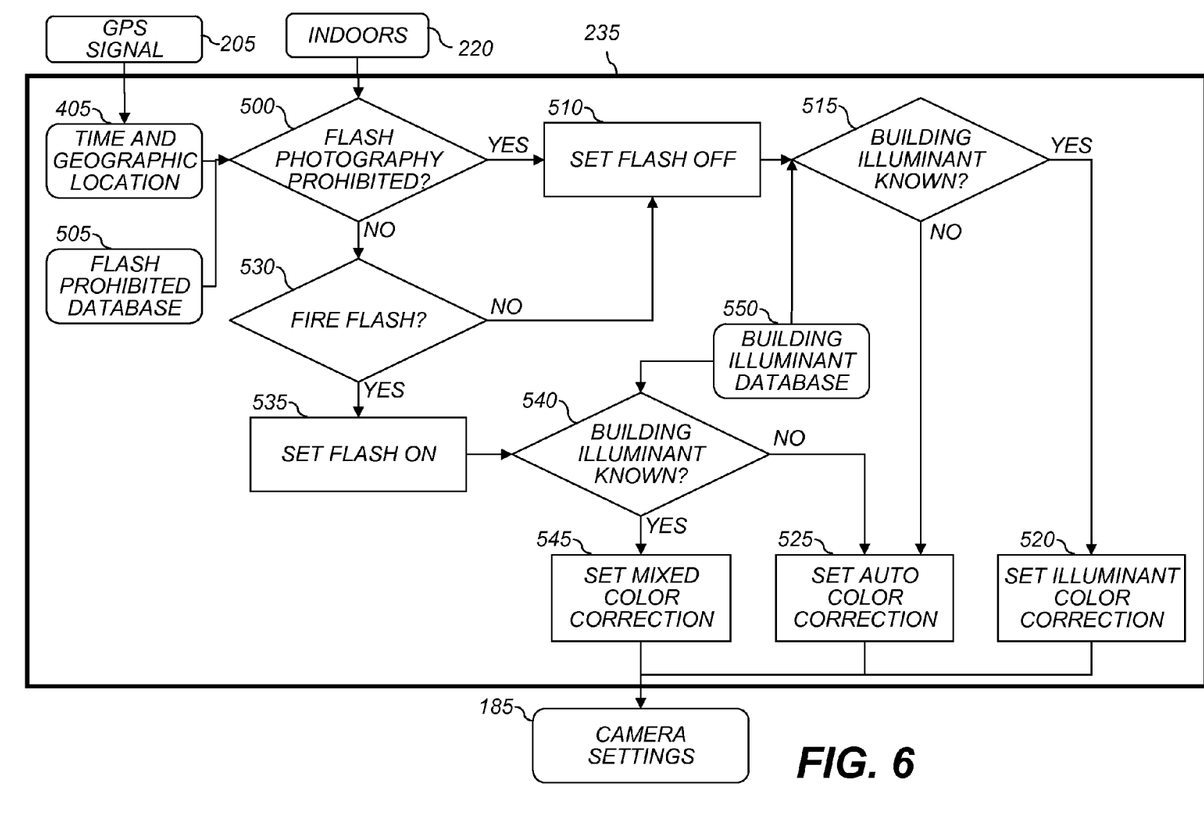
FIG. 6 is a flow chart giving more detail for the determine indoor camera settings step 235 of FIG. 3 according to one embodiment of the present invention.

FIG. 6 shows a flow chart illustrating more details of the determine indoor camera settings step 235 according to one embodiment of the present invention which selects between various indoor photography modes responsive to the GPS signal 205. A flash photography prohibited test 500 is used to determine whether the date/time and geographic location 405 determined from the GPS signal 205 corresponds to a geographic location where flash photography is known to be prohibited. If the geographic location corresponds to a location such as a theater, a museum or a public building where flash photography is prohibited, then the set flash off step 510 is executed to set the digital camera 10 to a no flash mode.

The flash photography prohibited test 500 determines whether flash photography is prohibited at a particular location by comparing the geographic location to a predefined flash prohibited database 505 specifying known flash prohibited zones. In some cases, flash photography may only be prohibited at certain times of the day. In this case, the flash prohibited database 505 can store both the locations of flash prohibited zones, together with corresponding time intervals. The flash photography prohibited step 500 can take into account both the time and the geographic location.

If the digital camera 10 is not determined to be in a flash prohibited zone, a fire flash test 530 is used to determine whether or not the flash 2 (FIG. 1) should be fired. The fire flash test 530 can use automatic algorithms well-known in the art to determine whether or not it is appropriate to use the flash 2 given the photography environment. For example, the flash 2 does not need to be fired if the scene illumination level is above a certain level. If the fire flash test 530 determines that the flash should not be fired, the process proceeds to the set flash off step 510, otherwise a set flash on step 535 is executed. The set flash on step 535 sets the digital camera 10 to capture images using the flash 2.

A building illuminant known test 540 is used to determine whether the digital camera 10 is located in a building with a known building illuminant. In some embodiments, the building illuminant known test 540 determines whether the building illuminant is known by comparing the geographic location to a predefined building illuminant database 550 specifying known building illuminant types as a function of geographic location. For example, certain public buildings may be known to use fluorescent illumination. The building illuminant database 550 can be determined by compiling a database for public locations where photographs are commonly captured.

In other embodiments, rather than storing the illuminant type, the building illuminant database 550 can store an indication of the building type as a function of geographic location. If the building type at a particular location is an office building, then it can be assumed that the illuminant type is probably office fluorescent. On the other hand, if the building type at a particular location is a home, then it can be assumed that the illuminant type is tungsten, or if the particular location is a sports arena, then it can be assumed that the illumination type corresponds to a metal vapor illuminant. The building illuminant known test 540 can also take into account the time of day. If the image is being captured in a home during the day, then it can be assumed that the illuminant will be a mixture of the interior illuminant with daylight coming through any windows.

If the building illuminant known test 540 determines a known illuminant, then a set mixed color correction step 545 can be used to choose color correction settings appropriate for a mixed illumination environment. In some embodiments, different color correction settings can be chosen depending on the identity of the determined illuminant. For example, one color correction setting can be used for mixed flash/fluorescent illumination, and a different color correction setting can be used for mixed flash/tungsten illumination. The different color correction settings can, for example, include different white balance settings and different color correction matrices that are optimized for the illumination conditions.

Otherwise, if the building illuminant known test 540 can not determine a known illuminant corresponding to the geographical location, a set auto color correction step 525 can be used to set the camera to an auto color correction mode which uses default indoor camera settings.

For the case where the flash is not used, an analogous building illuminant known test 515 can be applied to determine whether the digital camera 10 is located in a building with a known building illuminant. If not, then the set auto color correction step 525 is called as before. If a known illuminant is determined, then a set illuminant color correction step 520 is used to choose color correction settings appropriate for the determined known illuminant. For example, color correction settings optimized for fluorescent illumination can be selected if the geographic location is found to correspond to an office building known to use fluorescent illumination.

If the GPS signal 205 is too weak to determine the geographic location due to the fact that the digital camera 10 is indoors 220, then the flash photography prohibited test 500 and the building illuminant known tests 515 and 540 can use the last known geographic location to compare with the flash prohibited database 505 and the building illuminant database 550.

One skilled in the art will recognize that there are a wide variety of other ways that the camera settings 185 can be determined responsive to whether the digital camera 10 is outdoors 215 or indoors 220 in accordance with the present invention.

In some embodiments of the present invention the GPS signal 205 can be monitored over time to determine whether the digital camera 10 is moving. If it is detected that the digital camera is moving (e.g, if the photographer is walking or is in a moving vehicle), then various camera settings 185 can be adjusted accordingly. For example, a shorter exposure time can be used to reduce blur, or an image stabilization mode can be turned on.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
25 GPS sensor
26 speaker
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
90 white balance setting
95 white balance step
100 color sensor data
105 noise reduction step
110 ISO setting
115 demosaicing step
120 resolution mode setting
125 color correction step 130 color mode setting
135 tone scale correction step
140 contrast setting
145 image sharpening step
150 sharpening setting
155 image compression step
160 compression mode setting
165 file formatting step
170 metadata
175 user settings
180 digital image file
185 camera settings
200 sense GPS signal step
205 GPS signal
210 analyze GPS signal step
215 outdoors
220 indoors
225 determine outdoor camera settings step
235 determine indoor camera settings step
240 capture digital image step
245 input digital image
250 process digital image step
255 processed digital image
260 store digital image step
300 GPS signal strength
302 geographical location
305 weak GPS signal test
310 within known building test
315 geographical database
320 inconsistent altitude test.
325 building database
330 topology database
400 sunrise/sunset test
405 date/time and geographic location
410 set normal outdoor mode step
415 set sunset mode step
420 night test
425 set night mode step
500 flash photography prohibited test
505 flash prohibited database
510 set flash off step
515 building illuminant known test
520 set illuminant color correction step
525 set auto color correction step
530 fire flash test
535 set flash on step
540 building illuminant known test
545 set mixed color correction step
550 building illuminant database

The invention claimed is:

1. A digital image processing system, comprising:
a digital image sensor;
an optical system configured to form an image of a scene onto the digital image sensor;
a global positioning system sensor;
a processor-accessible memory system; and
a processing system, configured to perform operations comprising:
analyzing a signal from the global positioning system sensor to determine whether the digital image processing system is indoors or outdoors, wherein the analyzing comprises:
determining a geographic location of the digital image processing system;
comparing the determined geographic location to a geographic database indicating geographic locations of a plurality of known buildings, wherein the geographic database includes information providing an indication of a type of lighting associated with each of the plurality of known buildings; and
determining a likelihood that the digital image processing system is indoors in response to the determined geographic location corresponding to the location of one of the plurality of known buildings;
capturing a digital image of the scene using the digital image sensor;
processing the digital image responsive to the likelihood that the digital image processing system is indoors or outdoors and responsive to the indicated type of lighting associated with the one of the plurality of known buildings; and
storing the digital image in the processor-accessible memory system.

2. The digital image processing system of claim 1, wherein the geographic database includes information providing an indication of whether flash photography is appropriate in the one of the plurality of known buildings, and wherein the processing system is further configured to perform operations comprising setting a non-flash photography mode when the information in the database indicates that flash photography is inappropriate in the one of the plurality of known buildings.

3. The digital image processing system of claim 2, wherein the information providing the indication of whether flash photography is appropriate in the known building comprises an indicator of whether the flash photography is prohibited in the known building.

* * * * *